United States Patent
Geng et al.

(10) Patent No.: US 10,129,357 B2
(45) Date of Patent: Nov. 13, 2018

(54) MANAGING DATA STORAGE IN DISTRIBUTED VIRTUAL ENVIRONMENT

(71) Applicant: International Business Machines Corporation, Armonk, NY (US)

(72) Inventors: Jian Hua Geng, Beijing (CN); Yan Huang, Hui Zhou (CN); Ke Zhu, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 14/832,195

(22) Filed: Aug. 21, 2015

(65) Prior Publication Data

US 2017/0054720 A1    Feb. 23, 2017

(51) Int. Cl.
*G06F 9/455* (2018.01)
*H04L 29/08* (2006.01)

(52) U.S. Cl.
CPC ...... *H04L 67/2842* (2013.01); *H04L 67/1097* (2013.01); *G06F 9/455* (2013.01)

(58) Field of Classification Search
CPC .................................................. G06F 9/455
See application file for complete search history.

(56) References Cited

U.S. PATENT DOCUMENTS

| | | | |
|---|---|---|---|
| 7,353,360 B1 * | 4/2008 | Muller | G06F 12/10 709/223 |
| 7,389,393 B1 | 6/2008 | Karr et al. | |
| 7,447,854 B1 * | 11/2008 | Cannon | G06F 11/1451 711/162 |
| 8,055,845 B2 | 11/2011 | Soules et al. | |
| 8,307,026 B2 | 11/2012 | Gusler et al. | |
| 8,392,378 B2 | 3/2013 | Pafuni et al. | |
| 8,479,211 B1 | 7/2013 | Marshall et al. | |
| 8,583,773 B2 | 11/2013 | Pafumi et al. | |

(Continued)

FOREIGN PATENT DOCUMENTS

| | | |
|---|---|---|
| CN | 101385017 A | 3/2009 |
| CN | 101419535 A | 4/2009 |

(Continued)

OTHER PUBLICATIONS

Bryan, Steve et al., "Mercury: Host-side Flash Caching for the Data Center", 2012 IEEE 28th Symposium on Mass Storage Systems and Technologies (MSST), San Diego, California, Apr. 16-20, 2012, 12 pages.

(Continued)

*Primary Examiner* — William S Powers
(74) *Attorney, Agent, or Firm* — Francis Lammes; Stephen J. Walder, Jr.; Richard A. Wilhelm

(57) ABSTRACT

A mechanism is provided for managing data storage in a distributed virtual environment. A write access request to a virtual machine in the distributed virtual environment is received from a user, the virtual machine running on a hypervisor node in the distributed virtual environment. The data associated with the write access request is cached at the hypervisor node. The user is notified of a completion of the write access request. The cached data is transmitted to a storage node in the distributed virtual environment, the storage node providing physical storage to the virtual machine.

20 Claims, 7 Drawing Sheets

(56) References Cited

U.S. PATENT DOCUMENTS

| | | | |
|---|---|---|---|
| 8,863,124 B1* | 10/2014 | Aron | G06F 9/45533 709/223 |
| 2006/0047771 A1* | 3/2006 | Blackmore | H04L 67/1097 709/209 |
| 2008/0162805 A1* | 7/2008 | Springfield | G06F 12/0866 711/113 |
| 2013/0086006 A1* | 4/2013 | Colgrove | G06F 17/30159 707/692 |
| 2013/0117225 A1 | 5/2013 | Dalton | |
| 2016/0366220 A1* | 12/2016 | Gottlieb | H04L 67/1095 |

FOREIGN PATENT DOCUMENTS

| | | |
|---|---|---|
| CN | 103605630 A | 2/2014 |
| WO | WO2010/111312 A2 | 9/2010 |
| WO | WO2012/042509 A1 | 4/2012 |
| WO | WO2012/095848 A2 | 7/2012 |
| WO | WO2012/114338 A1 | 8/2012 |
| WO | WO2013/004136 A1 | 1/2013 |

OTHER PUBLICATIONS

Ding, Xiaoning et al., "A Buffer Cache Management Scheme Exploiting Both Temporal and Spatial Localities", ACM Transactions on Storage, vol. 3, No. 2, Article 5, Jun. 2007, 27 pages.

Ghoshal, Devarshi et al., "I/O Performance of Virtualized Cloud Environments", DataCloud-SC '11, Proceedings of the second international workshop on Data intensive computing in the clouds, http://datasys.cs.iit.edu/events/DataCloud-SC11/p08.pdf, Nov. 14, 2011, 10 pages.

* cited by examiner

MANAGING DATA STORAGE IN DISTRIBUTED VIRTUAL ENVIRONMENT

BACKGROUND

The present application relates generally to an improved data processing apparatus and method and more specifically to mechanisms for managing data storage in a distributed virtual environment.

With the development of computer hardware and software technologies, virtual machines (VMs) can provide more and more support to users. For example, when a user needs to use data computing resources and data storage resources, he/she does not have to purchase a high-performance physical machine and install necessary application programs on the physical machine; instead, the user may request computing resources and data storage resources to a cloud service provider, for example, and access these resources via the user's local desktop system.

Existing distributed virtual environments may already offer various computing resources and storage resources to users, whereas due to restrictions of physical configuration of a hypervisor node in the distributed virtual environment, resources (e.g., storage resources) cannot be provided to users without limit. In addition, the distributed virtual environments may be implemented by means of a network that, when a user accesses a virtual machine in the distributed virtual environment, the virtual machine fails to provide satisfactory response efficiency, i.e. there exists some latency between the user access and the virtual machine response.

SUMMARY

In one illustrative embodiment, a method, in a data processing system, is provided for managing data storage in a distributed virtual environment. The illustrative embodiment receives, from a user, a write access request to a virtual machine in the distributed virtual environment, the virtual machine running on a hypervisor node in the distributed virtual environment. The illustrative embodiment caches data associated with the write access request at the hypervisor node. The illustrative embodiment notifies the user of completion of the write access request. The illustrative embodiment transmits the cached data to a storage node in the distributed virtual environment, the storage node providing physical storage to the virtual machine.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
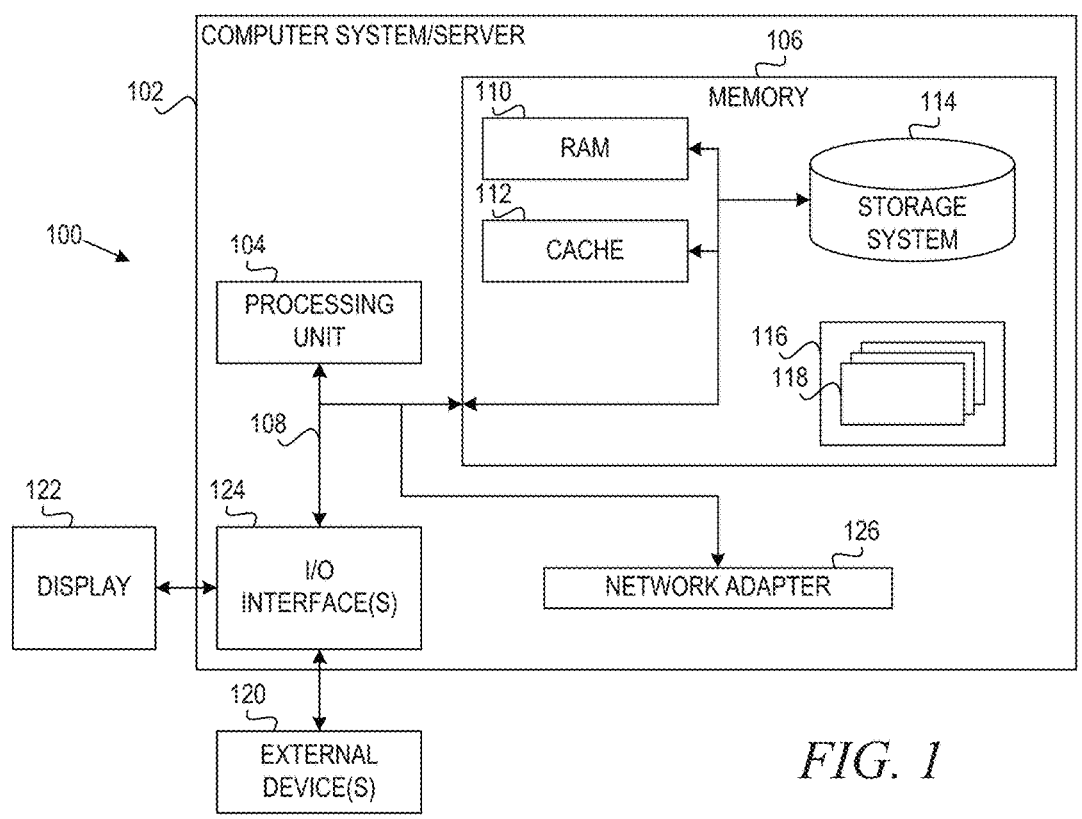
FIG. 1 schematically depicts a cloud computing node in accordance with an illustrative embodiment.

The illustrative embodiments provide for managing data storage in a distributed virtual environment. Whereas existing distributed virtual environments fail to provide resources (e.g., storage resources) without limit and whereas virtual machines fail to provide satisfactory response efficiency in terms of latency between the user access and the virtual machine response, the illustrative embodiments provide mechanisms for managing data storage in a distributed virtual environment so that larger volumes of data storage in a distributed virtual environment are provided and efficient user access to data storage is ensured.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Thus, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and Personal Digital Assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown in accordance with an illustrative embodiment. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 102 in cloud computing node 100 is shown in the form of a general-purpose computing device. The components of computer system/server 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 102 typically includes a variety of computer system readable media. Such media may be any available media that is accessible by computer system/server 102, and it includes both volatile and non-volatile media, removable and non-removable media.

System memory 106 can include computer system readable media in the form of volatile memory, such as random access memory (RAM) 110 and/or cache memory 112. Computer system/server 102 may further include other removable/non-removable, volatile/non-volatile computer system storage media. By way of example only, storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 116, having a set (at least one) of program modules 118, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. Program modules 118 generally carry out the functions and/or methodologies of embodiments of the invention as described herein.

Computer system/server 102 may also communicate with one or more external devices 120 such as a keyboard, a pointing device, a display 122, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 124. Still yet, computer system/server 102 can communicate with one or more networks such as a local area network (LAN), a general wide area network (WAN), and/or a public network (e.g., the Internet) via network adapter 126. As depicted, network adapter 126 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Figure 2:
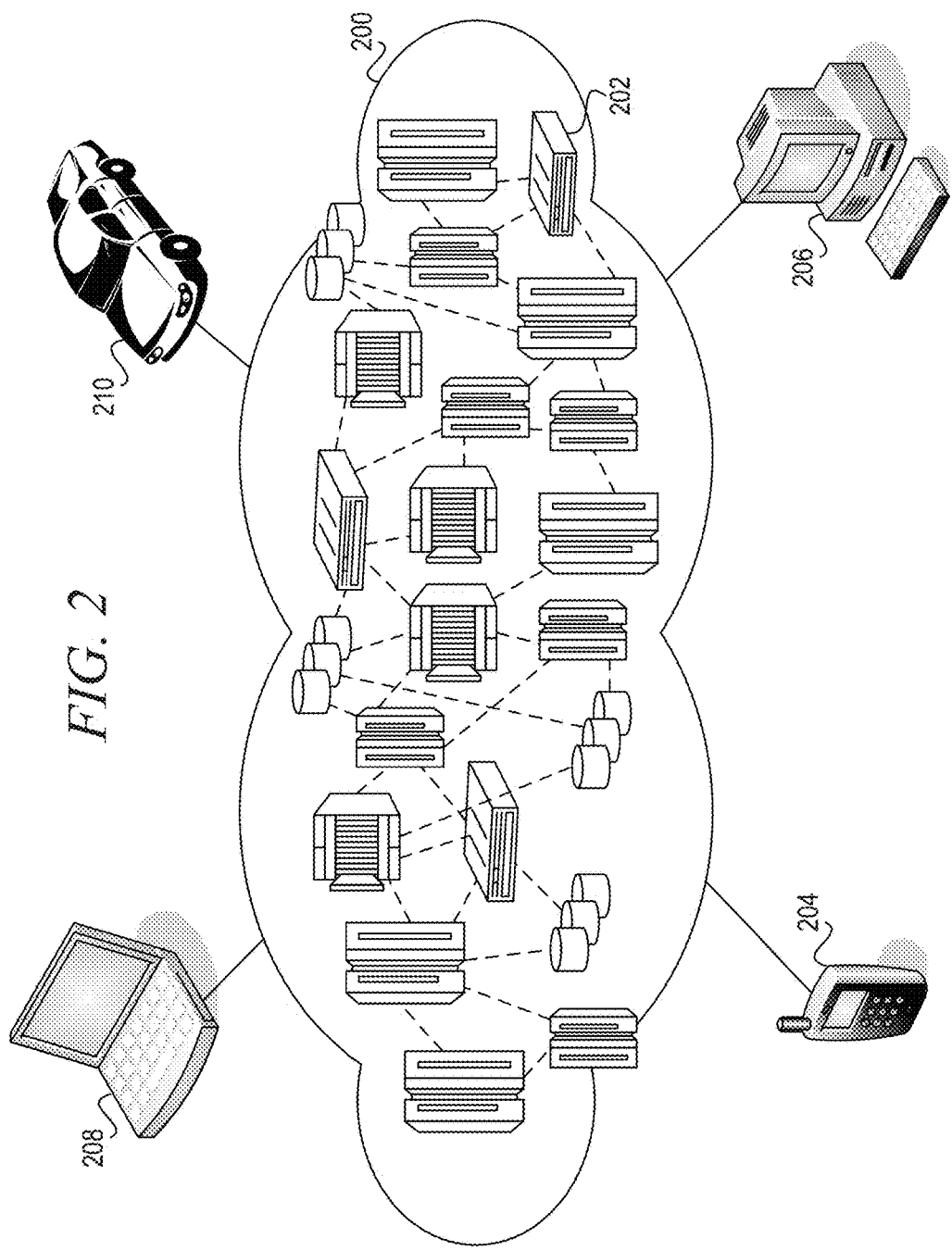
FIG. 2 schematically depicts a cloud computing environment in accordance with an illustrative embodiment.

Referring now to FIG. 2, illustrative cloud computing environment 200 is depicted in accordance with an illustrative embodiment. As shown, cloud computing environment 200 comprises one or more cloud computing nodes 202, such as computing node 100 of FIG. 1, with which local computing devices used by cloud consumers, such as, for example, personal digital assistant (PDA) or cellular telephone 204, desktop computer 206, laptop computer 208, and/or automobile computer system 210 may communicate. Nodes 202 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 204-210 shown in FIG. 2 are intended to be illustrative only and that computing nodes 202 and cloud computing environment 200 can communicate with any type of computerized device over any type of network and/or network addressable connection (e.g., using a web browser).

Figure 3:
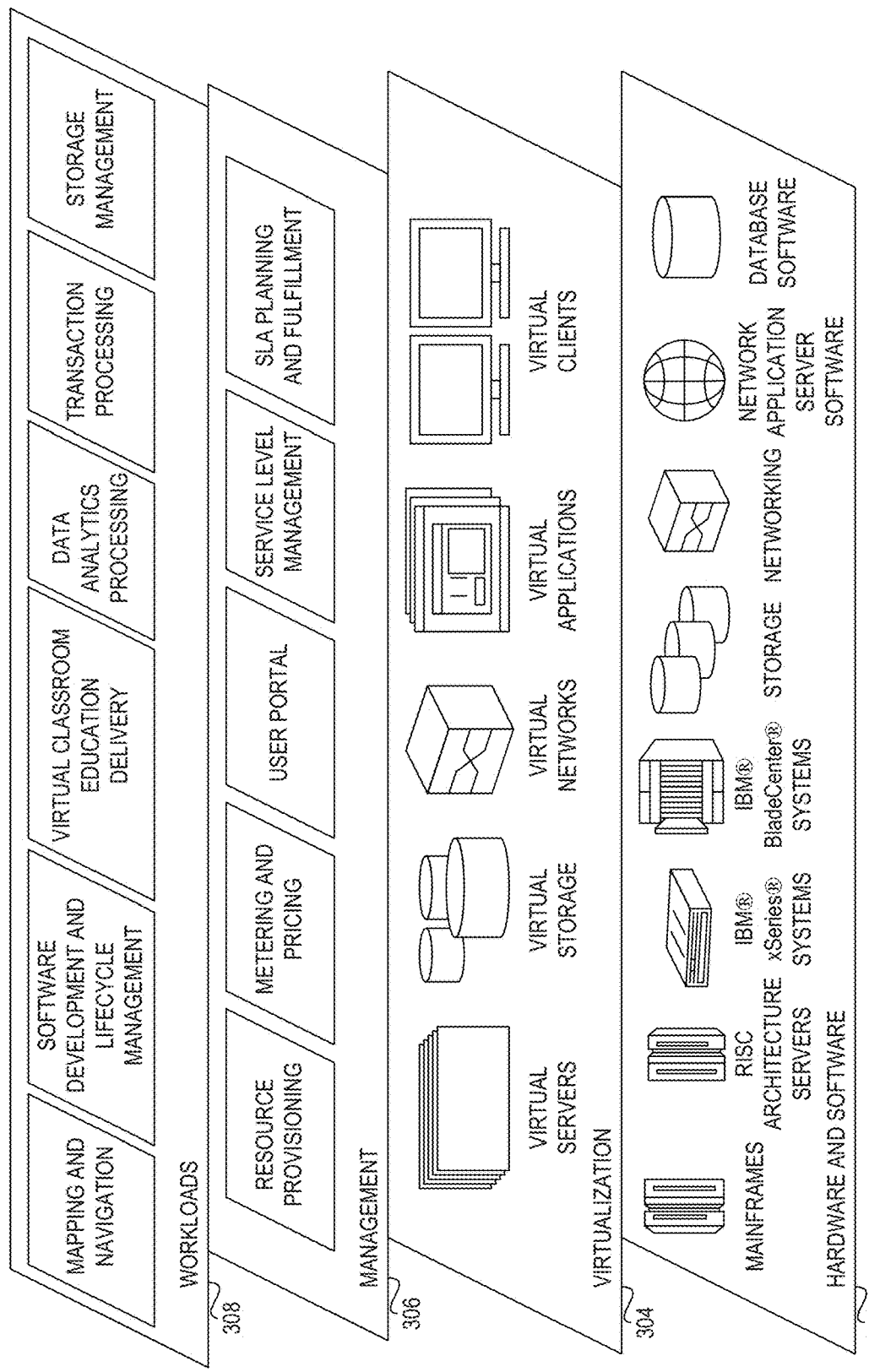
FIG. 3 schematically depicts abstraction model layers in accordance with an illustrative embodiment.

Referring now to FIG. 3, a set of functional abstraction layers provided by cloud computing environment 200 of FIG. 2 are shown in accordance with an illustrative embodiment. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include mainframes, in one example IBM® zSeries® systems: RISC (Reduced Instruction Set Computer) architecture based servers, in one example IBM pSeries systems; IBM xSeries® systems; IBM BladeCenter systems; storage devices: networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 304 provides an abstraction layer from which the following examples of virtual entities may be provided: virtual servers; virtual storage; virtual networks, including virtual private networks; virtual applications and operating systems; and virtual clients.

In one example, management layer 306 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 308 provides examples of functionality for which the cloud computing environment may be utilized. Examples of workloads and functions which may be provided from this layer include: mapping and navigation; software development and lifecycle management, virtual classroom education delivery; data analytics processing; transaction processing; and storage device management.

Due to restrictions of physical configuration of a hypervisor node in a distributed virtual environment as well as latency caused by network and other reasons in the distributed virtual environment, currently it is impossible to provide virtual machines with data storage of large volume and higher response efficiency. To solve these drawbacks in the prior art, various embodiments propose a technical solution for managing data storage in a distributed virtual environment.

In one embodiment, multiple virtual machines may be provisioned at the hypervisor node. The hypervisor node is typically a computing device having a strong computing capacity and a large storage volume. In this manner, when a user accesses a storage device of the virtual machine, the user directly accesses the hypervisor node, at which point the user fast accesses a storage device locally at the hypervisor node. In order to provide scalable data storage capacity to virtual machines, storage nodes may be attached to the hypervisor node. Thereby, a storage device with large storage volume may be provided to the virtual machine at a dedicated storage node that is separate from the hypervisor node.

Figure 4:
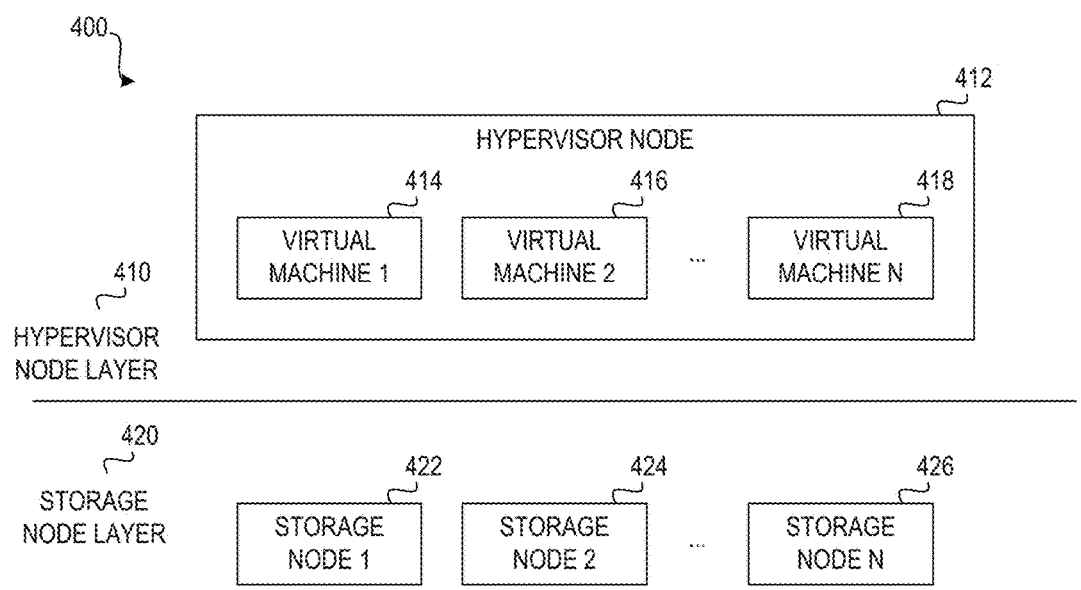
FIG. 4 schematically depicts an architecture diagram of a technical solution for managing data storage in a distributed virtual environment in accordance with an illustrative embodiment.

Specifically, FIG. 4 schematically shows an architecture diagram 400 of a technical solution for managing data storage in a distributed virtual environment in accordance with an illustrative embodiment. As shown in FIG. 4, in one embodiment, storage devices are provided to virtual machines at two layers, namely a hypervisor node layer 410 and a storage node layer 420. Specifically, at hypervisor node layer 410, multiple virtual machines run in a hypervisor node 412, such as a virtual machine 1 414, a virtual machine 2 416, . . . , and a virtual machine N 418; at this layer, high performance I/O operation may be provided. When making data access at this layer, operations may be performed directly at a local storage device (e.g., hard disk) of the hypervisor node 412, so various I/O operations being received may be efficiently responded to.

Second-level data storage devices may be provisioned at storage node layer 420, which layer may include multiple storage nodes, such as a storage node 1 422, a storage node 2 424, . . . , and a storage node N 426. Since storage devices at hypervisor node layer 410 provide more efficient data access, when the user accesses a virtual machine, first data associated with write access may be cached at hypervisor node 412 and, after the write access operation between the user and hypervisor node 412 ends, a message indicative of operation completion is returned to the user. Subsequently, data may be transmitted from hypervisor node 412 to storage nodes (such as storage node 1 422) within the distributed virtual environment. In this manner, although network operations with quite low transmission efficiency will be involved inside the distributed virtual environment, to the external user, virtual machines in the distributed virtual environment can provide the outside with larger storage capacity and higher access speed.

Specifically, in one embodiment, there is provided a management mechanism for managing data storage in a distributed virtual environment. The management mechanism receives, from a user, a write access request to a virtual machine in the distributed virtual environment, the virtual machine running at a hypervisor node in the distributed virtual environment. The management mechanism caches data associated with the write access request at the hypervisor node and notifies the user of completion of the write access request. The management mechanism then transmits the cached data to a storage node in the distributed virtual environment, the storage node providing physical storage to the virtual machine.

Figure 5:
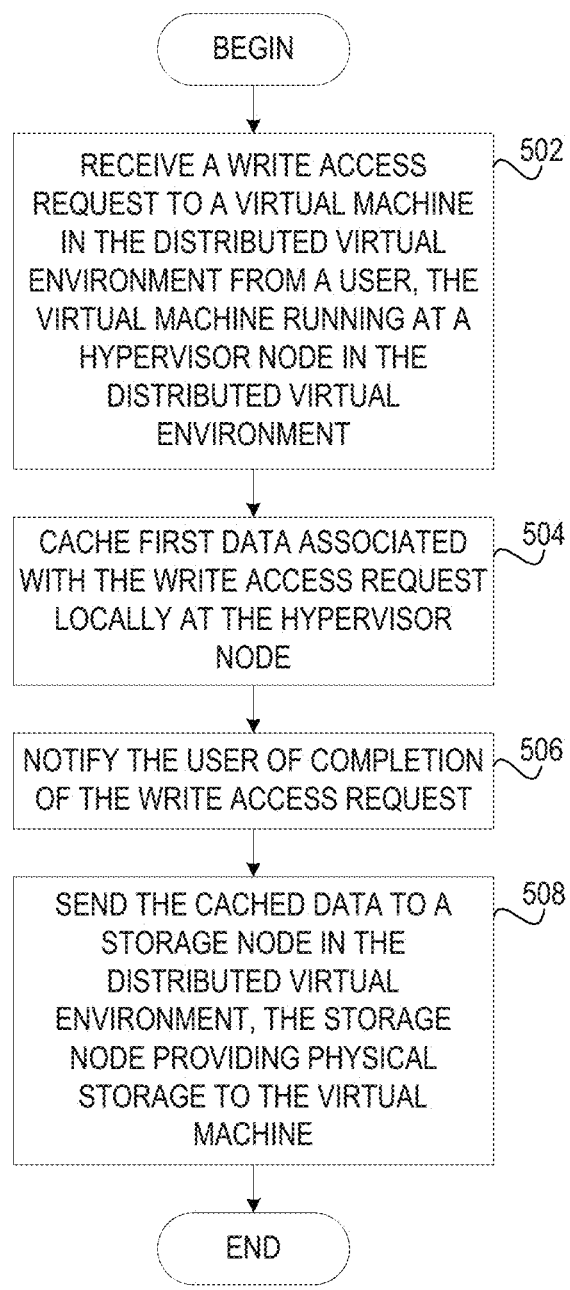
FIG. 5 schematically depicts a flowchart of a method for managing data storage in a distributed virtual environment in accordance with an illustrative embodiment.

FIG. 5 schematically shows a flowchart of the operation performed for managing data storage in a distributed virtual environment in accordance with an illustrative embodiment. Specifically, as the operation begins, a management mechanism receives a write access request to a virtual machine in the distributed virtual environment from a user, the virtual machine running at a hypervisor node in the distributed virtual environment (step 502). When the virtual machine is launched, the management mechanism loads data associated with the virtual machine into the hypervisor node, so the user may conduct read data access by directly communicating with the hypervisor node. In the context of the illustrative embodiments, to increase the data access efficiency means increasing the efficiency of write access to data in the virtual machine.

The management mechanism then caches data associated with the write access request at the hypervisor node. Although the purpose of the write access request to data in the virtual machine is to write data to a storage device (e.g., hard disk physically located at the storage node) of the virtual machine, in order to provide a higher access efficiency to the user, the management mechanism caches first data associated with the write access request locally at the hypervisor node (step 504), and in a subsequent operation, transmits data within the distributed virtual environment, thereby achieving final write access.

The management mechanism notifies the user of completion of the write access request (step 506). By means of the technical solution of the illustrative embodiments, the management mechanism notifies the user of completion of the write access request after caching data associated with the write access request at the hypervisor node. In this way, with respect to the external user, since the hypervisor node directly responds to the user's write access request, the user does not have to wait while the distributed virtual environment is performing internal processing, but the user may consider completion of the write operation after receiving a message indicative of completion of the write access request.

Specifically, suppose the user is editing a 1 GB video file in the virtual machine, and after the edition is completed, the user wishes to write the edition result to the virtual machine through a write operation. According to the technical solution described in the illustrative embodiments, first the user's edition result (i.e., 1 GB video file) may be cached at the hypervisor node. Afterwards, the management mechanism sends a message indicative of completion of the write operation to the user immediately, thereby greatly reducing the user's wait time. The virtual machine appears as an independent computing device logically with respect to the external user; although the edition result is not yet written to a final storage location at this point, subsequent operation belongs to internal operation of the distributed virtual mechanism, and the user does not need care about details.

The management mechanism then sends the cached data to a storage node in the distributed virtual environment, the storage node providing physical storage to the virtual machine (step 508), with the operation terminating thereafter. In this embodiment, it is actually the storage node that provides physical storage to the virtual machine within the distributed virtual environment; the data transmission operation performed in step 508 belongs to internal operation of the distributed virtual environment, and the user does not need to know details.

Therein lays an advantage of the illustrative embodiments: the external user is shielded from operational details within the distributed virtual environment, and after the hypervisor node completes the user's write access request, the user may be notified of completion of the write access request. Thereby, the user does not have to wait while the distributed virtual system is conducting internal data processing.

In one embodiment, the management mechanism transmits the cached data to the storage node in the distributed virtual environment by, in batch processing operation, transmitting, from the hypervisor node to the storage node, data cached at the hypervisor node, where the data is associated with multiple write access requests.

Although the above embodiments have introduced how to implement the technical solution of the illustrative embodiments with an example of how to handle one write access request with respect to one virtual machine, multiple write access requests with respect to one or more virtual machines may further be involved in the context of the illustrative embodiments. According to this embodiment, it is unnecessary to transmit cached data associated with each write access request from the hypervisor node to the storage node immediately after sending a notification indicative of completion of each write access request; instead, cached data associated with multiple write access requests may be transmitted to the same storage node all at once in a batch processing operation.

Specifically, returning to the example shown in FIG. 4, storage node 1 422 provides physical storage for virtual machine 1 414 and virtual machine 2 416, respectively. At this point, associated data of both virtual machines 1 414 and 2 416 is stored in storage node 1 422. Suppose a write access request 1 executes write operation to a file 1 in virtual machine 1 414, whereby modified file 1 is formed; an access request 2 executes write operation to a file 2 in virtual machine 2 426, whereby modified file 2 is formed. According to the embodiment, both modified file 1 and modified file 2 may be transmitted from hypervisor node 412 to storage node 1 422 in batch processing operation.

In one embodiment, it is not intended to limit a correspondence relationship between storage nodes and virtual machines, but one storage node may provide physical storage to one or more virtual machines and one virtual machine may have one or more storage nodes providing physical storage thereto. In this case, one write request may involve one or more storage nodes. Those skilled in the art may implement concrete batch processing operation according to the above described principle, for example, data may be periodically transmitted from the hypervisor node to a corresponding storage node, transmission may be conducted when data cached in the hypervisor node reaches a certain amount, etc.

Therefore, in one embodiment, the management mechanism transmits the cached data to the storage node in the distributed virtual environment by recording at least one difference between the cached data and corresponding data in the storage node before executing the write access request; and transmitting only the difference to the storage node.

Using a technical solution of the illustrative embodiments, operations in step 508 belongs to an internal operation of the distributed virtual environment. To further reduce the data transmission amount between the hypervisor node and the storage node, it is possible to transmit only the difference between the cached data and corresponding data before executing the write access request, i.e., transmit changed data only.

Continuing the foregoing example, suppose the user adds video (e.g., 15 MBs) at the end of the 1 GB video file; in this example, the difference may include the newly added 15 MB data and a location where the newly added data is inserted (e.g., the end of the original file). In this example, only the newly added 15 MB data rather than the entire 1 GB+15 MB data needs to be transmitted between the hypervisor node and the storage node. In one embodiment, any approach that is known in the prior art and/or to be developed in the future may be utilized to record the difference between the cached data and corresponding data before executing the write access request.

Note that, although different aspects of the illustrative embodiments have been described above in different embodiments, those skilled in the art may understand these aspects may be combined. Specifically, as described in batch processing operation, data cached at the hypervisor node and associated with multiple write access requests may further be difference data (i.e., data recording difference between the cached data and corresponding data before executing the write access request). Therefore, in one combined embodiment, "difference data" cached at the hypervisor node and associated with multiple write access requests may be transmitted to the storage node in batch processing operation.

Thus, in one embodiment, the management mechanism transmits the cached data to the storage node in the distributed virtual environment by obtaining a physical address in the storage node of storage data corresponding to the cached data; and writing the cached data at the physical address in the storage node.

Since the storage node provides physical storage to the virtual machine, when transmitting the cached data to the storage node, data should be written at a location where data associated with the write request is stored in the storage nodes, whereby consistency between data in the storage nodes and data cached in the hypervisor node can be ensured. Specifically, suppose the write operation modifies data in a data block 1 in VM-1 running in the hypervisor node, and modification details relate to a character with an offset address 0x1000 in data block 1 from "a" to "b." At this point, it is needed to obtain a corresponding data block address, in the storage node, of the data block 1 in the hypervisor node; calculate a physical address, in the storage node, of the character "a" in data block 1; and subsequently set a character at this address as "b", whereby data transmission operation inside the distributed virtual system is completed.

The address of data in the virtual machine is a visible address to the external user. However, physical storage associated with the virtual machine cannot be accessed directly via the address, so the address of data in the virtual machine needs to be mapped to a real physical address before implementing data transmission from the hypervisor node to the storage node. Specifically, an address in the virtual machine may be mapped to a physical address in the storage node via a first address and a second address.

Figure 6:
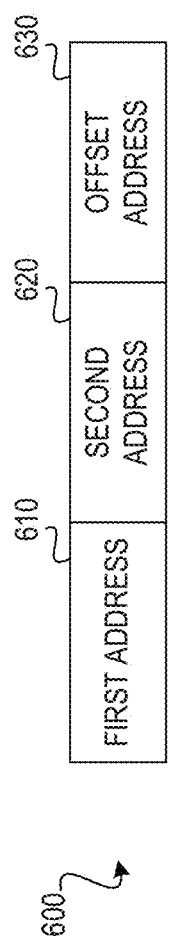
FIG. 6 schematically depicts an example of a physical address of data in a cluster of storage nodes in accordance with an illustrative embodiment.

FIG. 6 schematically shows an example of a physical address 600 of data in a cluster of storage nodes in accordance with an illustrative embodiment. The first address 610 may represent an address of a storage node (i.e., which storage node provides physical storage to the virtual machine), the second address 620 may represent an address of a concrete data block (i.e., address offset in the storage node of a data block), and an offset address 630 represents offset in the data block of modified content.

In the embodiment, various approaches may be utilized to record a correspondence relationship between virtual machines and storage nodes. For example, the first address may be set to record which storage node provides physical storage to which virtual machine. Suppose the distributed virtual environment includes a virtual machine VM-1, a virtual machine VM-2 and a virtual machine VM-N, a storage node SN-1 provides physical storage to VM-1 and VM-2, and a storage node SN-M provides physical storage to VM-N. Then a first address table may be stored in a data structure as shown in Table 1 below.

TABLE 1

First Address Table

| No. | Virtual Machine | Storage Node |
|---|---|---|
| 1 | VM-1 | SN-1 |
| 2 | VM-2 | SN-1 |
| 3 | VM-N | SN-M |

In one embodiment, a second address table may further be utilized to store addresses of various data blocks. Suppose the virtual machine VM-1 includes 10 data blocks, then a second address table associated with the virtual machine VM-1 may be stored in a data structure as shown in Table 2 below.

TABLE 2

Second Address Table

| No. | Data Block | Address |
|---|---|---|
| 1 | data block 1 | 0x0001 . . . 0 |
| 2 | data block 2 | 0x0002 . . . 0 |
| . . . | . . . | . . . |
| 10 | data block 10 | 0x000A . . . 0 |

In one embodiment, the management mechanism obtains the physical address in the storage node of storage data corresponding to the cached data by querying a first address table to obtain a first address of the storage node providing physical storage to the virtual machine, querying a second address table to obtain a second address of a data block in the storage node, obtaining an offset address of the cached data in the hypervisor node, and combining the first address, the second address and the offset address to form the physical address.

Continuing the foregoing example, suppose a character with an offset address 0x1000 in data block 1 in VM-1 is modified from "a" to "b", then a physical address of the character "a" in the storage node may be represented as "SN-1: 0x0001 . . . 01000."

In the embodiment, it is not intended to limit where the first address table is stored. For example, the first address table may be stored in the hypervisor node, the storage node or at any storage location accessible via a network. For the convenience purpose, the first address table may be stored in the storage node; for the security purpose, however, the first address table may be saved in multiple storage nodes. To facilitate management, storage nodes may be divided into manager nodes and member nodes, wherein the manager node is responsible for managing and updating a correspondence relationship between data in the virtual machine and data in the storage node (e.g., the first address table and the second address table), while the member node is for storing data on a virtual machine associated with itself.

In one embodiment, the management mechanism elects a manager node among multiple storage nodes in the virtual environment, for saving the first address table in the manager node. A node with higher hardware configuration and running more stably may be selected as a manager node from multiple storage nodes. Or multiple manager nodes may be set, and it is ensured only one manager node is in activated state at the same time. When fault occurs in a current manager node, a node may be selected as a new manager from candidate member nodes. Thereby, the security of the distributed virtual environment may be ensured.

In the context of the illustrative embodiments, the first address table as shown in Table 1 above may be stored in the manager node, and the second address table as shown in Table 2 above may be stored in storage node SN-1. When storage node SN-1 is the manager node, both the first address table and the second address table are stored in storage node SN-1. At this point, the manager node may be considered as a member node managing and updating a correspondence relationship between data in the virtual machine and data in the storage node.

In one embodiment, the management mechanism, after transmitting the cached data to one storage node in the distributed virtual environment, synchronizes the cached data at another storage node in the distributed virtual environment. To further enhance the security of the distributed virtual environment, multiple storage nodes may provide physical storage for the same data in the same virtual machine. For example, data associated with VM-1 may be stored in both the storage nodes SN-1 and SN-2. Therefore, after completing the transmission of the cached data to one storage node, the cached data may be synchronized at the other storage node. In this manner, when fault occurs in storage node SN-1, still SN-2 may serve VM-1.

Specifically, suppose data associated with the write operation to VM-1 has been transmitted from the hypervisor node to SN-1, the associated data is synchronized from SN-1 to SN-2, so as to provide higher reliability.

Note the embodiment is not intended to limit whether all data associated with a virtual machine in one storage node is to be synchronized from another storage node, but selectively only one part of data may be synchronized to another storage node; or further one part of data may be synchronized to one storage node, and other part of data may be synchronized to other storage node. In the foregoing example, suppose virtual machine VM-1 has a 5 GB storage space, and storage node SN-1 provides 5 GB physical storage for virtual machine VM-1. During the synchronization operation, 2 GB data in VM-1 may be synchronized to SN-2, while the remaining 3 GB data in VM-1 may be synchronized to SN-M.

Figure 7:
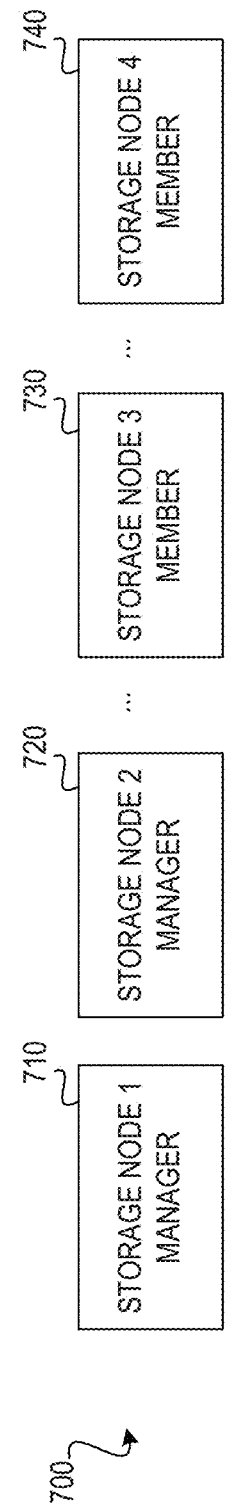
FIG. 7 schematically depicts a schematic view of storage nodes in accordance with an illustrative embodiment.

FIG. 7 schematically shows a schematic view 700 of storage nodes in accordance with an illustrative embodiment. Storage nodes as shown in FIG. 7 may provide a two-level security mechanism. First of all, multiple manager nodes (e.g., a storage node 1 710 and a storage node 2 720) may be set, and it is ensured only one storage node is an activated manager node at any moment (either storage node 1 710 or storage node 2 720). Thereby, it can be ensured when fault occurs in a current manager node (storage node 1 710), an appropriate node may be selected from other inactivated manager nodes (storage node 2 720) to function as a manager node. On the other hand, by synchronizing storage nodes, data of the same virtual machine may be saved in multiple storage nodes (storage node 3 730 and storage node 4 740), so as to provide more reliable data storage.

In one embodiment, the management mechanism, after synchronizing the cached data at another storage node in the distributed virtual environment, updates the first address table and the second address table based on configuration of the other storage node.

Note that, since the above synchronization process will change a mapping relationship between virtual machines and storage nodes, further the first address table and the second address table need to be adjusted accordingly after the synchronization. For the first address table, a storage node providing physical storage to a virtual machine needs to be added to the first address table after the synchronization. For example, an entry "4, VM-1, SN-2" is inserted into the first address table as shown in Table 1 above, which represents storage node SN-2 also provides physical storage to virtual machine VM-1. In addition, the second address table needs to be adjusted accordingly according to address change of a data block.

Figure 8:
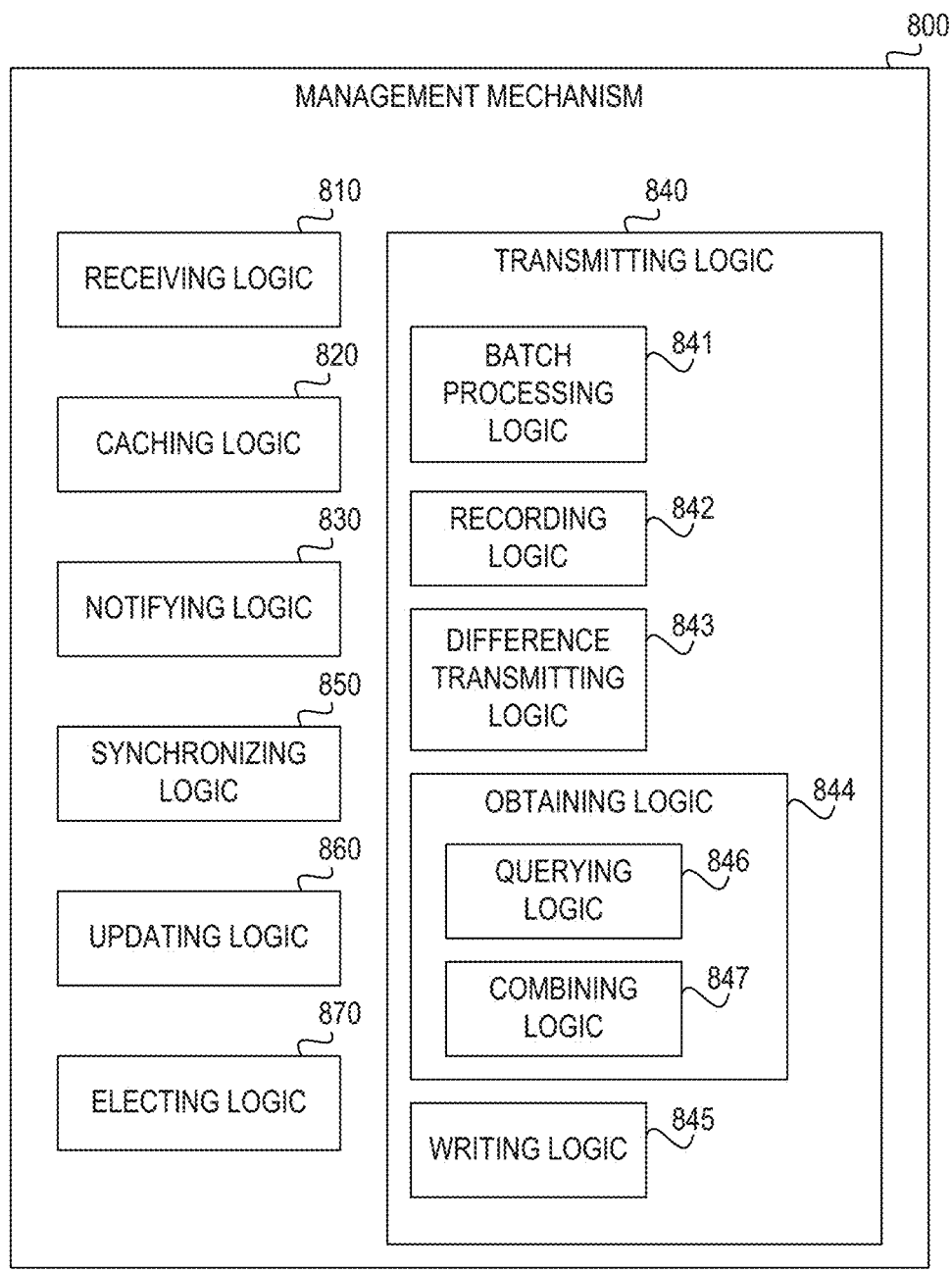
FIG. 8 schematically depicts a block diagram of an apparatus for managing data storage in a distributed virtual environment in accordance with an illustrative embodiment.

FIG. 8 schematically shows a block diagram of management mechanism 800 for managing data storage in a distributed virtual environment in accordance with an illustrative embodiment. Specifically, there is provided a management mechanism for managing data storage in a distributed virtual environment. Management mechanism 800 comprises receiving logic 810 to receive, from a user, a write access request to a virtual machine in the distributed virtual environment, the virtual machine running at a hypervisor node in the distributed virtual environment. Management mechanism 800 further comprises caching logic 820 to cache data associated with the write access request at the hypervisor node and notifying logic 830 to notify the user of completion of the write access request. Additionally, management mechanism 800 comprises transmitting logic 840 configured to transmit the cached data to a storage node in the distributed virtual environment, the storage node providing physical storage to the virtual machine.

Transmitting logic 840 may further comprise batch processing logic 841 that, in a batch processing operation, transmits, from the hypervisor node to the storage node, data cached at the hypervisor node, where the data is associated with multiple write access requests, as well as recording logic 842 that records the difference between the cached data and the corresponding data before executing the write access request and difference transmitting logic 843 that transmits only the difference to the storage node.

Transmitting logic 840 may further comprise obtaining logic 844 that obtains a physical address in the storage node of storage data corresponding to the cached data and writing logic 845 that writes the cached data at the physical address in the storage node.

Obtaining logic 844 may further comprise querying logic 846 that queries a first address table to obtain a first address of the storage node providing physical storage to the virtual machine, queries a second address table to obtain a second address of a data block in the storage node, and obtains an offset address of the cached data in the hypervisor node. Obtaining logic 844 may further comprise combining logic 847 that combines the first address, the second address, and the offset address to form the physical address.

Management mechanism 800 may further comprise synchronizing logic 850 that, after transmitting the cached data to one storage node in the distributed virtual environment, synchronizes the cached data at another storage node in the distributed virtual environment. Management mechanism 800 may still further comprise updating logic 860 that, after synchronizing the cached data at another storage node in the distributed virtual environment, updates the first address table and the second address table based on configuration of the other storage node. Finally, management mechanism 800 may further comprise electing logic 870 that elects a manager node among multiple storage nodes in the virtual environment, for saving the first address table in the manager node.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for managing data in a distributed virtual environment. Thus, with the illustrative embodiments, larger-capacity data storage may be provided and it may be ensured the user can efficiently access the data storage, while hardware configuration of data storage in the existing distributed virtual environment is modified as little as possible.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for managing data storage in a distributed virtual environment, the method comprising:
    receiving, from a user, a write access request to a virtual machine in the distributed virtual environment, the virtual machine running on a hypervisor node in the distributed virtual environment;
    caching data associated with the write access request at the hypervisor node;
    notifying the user of completion of the write access request; and
    after notifying the user of completion of the write access request, transmitting the cached data from the hypervisor node to a storage node in the distributed virtual environment, the storage node providing physical storage to the virtual machine.

2. The method of claim 1, wherein transmitting the cached data to the storage node in the distributed virtual environment comprises:
    in batch processing operation, transmitting, from the hypervisor node to the storage node, data cached at the hypervisor node, wherein the data is associated with multiple write access requests.

3. The method of claim 1, wherein transmitting the cached data to the storage node in the distributed virtual environment comprises:
    recording at least one difference between the cached data and corresponding data in the storage node before executing the write access request; and
    transmitting only the difference from the hypervisor node to the storage node.

4. The method of claim 1, wherein transmitting the cached data to the storage node in the distributed virtual environment comprises:
    obtaining a physical address in the storage node of storage data corresponding to the cached data; and
    writing the cached data at the physical address in the storage node.

5. The method of claim 4, wherein obtaining the physical address in the storage node of storage data corresponding to the cached data comprises:
    querying a first address table to obtain a first address of the storage node providing physical storage to the virtual machine;
    querying a second address table to obtain a second address of a data block in the storage node;
    obtaining an offset address of the cached data in the hypervisor node; and
    combining the first address, the second address, and the offset address to form the physical address.

6. The method of claim 5, further comprising:
    electing a manager node among multiple storage nodes in the virtual environment, for saving a first address table in the manager node.

7. The method of claim 1, further comprising:
    after transmitting the cached data to the storage node in the distributed virtual environment, synchronizing the cached data at another storage node in the distributed virtual environment.

8. The method of claim 7, further comprising:
    after synchronizing the cached data at the other storage node in the distributed virtual environment, updating a first address table and a second address table based on a configuration of the other storage node.

9. An apparatus comprising:
    a processor; and
    a memory coupled to the processor, wherein the memory comprises instructions which, when executed by the processor, cause the processor to:
    receive, from a user, a write access request to a virtual machine in the distributed virtual environment, the virtual machine running on a hypervisor node in the distributed virtual environment;
    cache data associated with the write access request at the hypervisor node;
    notify the user of completion of the write access request; and
    after notifying the user of completion of the write access request, transmit the cached data from the hypervisor node to a storage node in the distributed virtual environment, the storage node providing physical storage to the virtual machine.

10. The apparatus of claim 9, wherein the instructions to transmit the cached data to the storage node in the distributed virtual environment further cause the processor to:
    in batch processing operation, transmit, from the hypervisor node to the storage node, data cached at the hypervisor node, wherein the data is associated with multiple write access requests.

11. The apparatus of claim 9, wherein the instructions to transmit the cached data to the storage node in the distributed virtual environment further cause the processor to:
    record at least one difference between the cached data and corresponding data in the storage node before executing the write access request; and
    transmit only the difference from the hypervisor node to the storage node.

12. The apparatus of claim 9, wherein the instructions to transmit the cached data to the storage node in the distributed virtual environment further cause the processor to:
    obtain a physical address in the storage node of storage data corresponding to the cached data; and write the cached data at the physical address in the storage node.

13. The apparatus of claim 12, wherein the instructions to obtain the physical address in the storage node of storage data corresponding to the cached data further cause the processor to:
 query a first address table to obtain a first address of the storage node providing physical storage to the virtual machine;
 query a second address table to obtain a second address of a data block in the storage node;
 obtain an offset address of the cached data in the hypervisor node; and
 combine the first address, the second address, and the offset address to form the physical address.

14. The apparatus of claim 13, wherein the instructions further cause the processor to:
 elect a manager node among multiple storage nodes in the virtual environment, for saving a first address table in the manager node.

15. The apparatus of claim 9, wherein the instructions further cause the processor to:
 after transmitting the cached data to the storage node in the distributed virtual environment, synchronize the cached data at another storage node in the distributed virtual environment.

16. The apparatus of claim 15, wherein the instructions further cause the processor to:
 after synchronizing the cached data at the other storage node in the distributed virtual environment, update a first address table and a second address table based on a configuration of the other storage node.

17. A computer program product comprising a computer readable storage medium having a computer readable program stored therein, wherein the computer readable program, when executed on a computing device, causes the computing device to:
 receive, from a user, a write access request to a virtual machine in the distributed virtual environment, the virtual machine running on a hypervisor node in the distributed virtual environment;
 cache data associated with the write access request at the hypervisor node;
 notify the user of completion of the write access request; and
 after notifying the user of completion of the write access request, transmit the cached data from the hypervisor node to a storage node in the distributed virtual environment, the storage node providing physical storage to the virtual machine.

18. The computer program product of claim 17, wherein the computer readable program to transmit the cached data to the storage node in the distributed virtual environment further causes the computing device to:
 in batch processing operation, transmit, from the hypervisor node to the storage node, data cached at the hypervisor node, wherein the data is associated with multiple write access requests.

19. The computer program product of claim 17, wherein the computer readable program to transmit the cached data to the storage node in the distributed virtual environment further causes the computing device to:
 record at least one difference between the cached data and corresponding data in the storage node before executing the write access request; and
 transmit only the difference from the hypervisor node to the storage node.

20. The computer program product of claim 17, wherein the computer readable program to transmit the cached data to the storage node in the distributed virtual environment further causes the computing device to:
 obtain a physical address in the storage node of storage data corresponding to the cached data; and
 write the cached data at the physical address in the storage node.

* * * * *